(12) United States Patent
Wen et al.

(10) Patent No.: US 7,525,712 B2
(45) Date of Patent: Apr. 28, 2009

(54) BROAD SPECTRAL RANGE POLARIZATION ROTATOR

(75) Inventors: Bing Wen, Camarillo, CA (US); Milind P. Mahajan, Thousand Oaks, CA (US); Bruce K Winker, Ventura, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 211 days.

(21) Appl. No.: 11/238,307

(22) Filed: Sep. 29, 2005

(65) Prior Publication Data

US 2007/0070501 A1    Mar. 29, 2007

(51) Int. Cl.
*G02F 1/03* (2006.01)
(52) U.S. Cl. ...................................... 359/252
(58) Field of Classification Search ................. 359/252, 359/253, 256, 259, 501, 498, 497
See application file for complete search history.

(56) References Cited

U.S. PATENT DOCUMENTS 5,243,455 A * 9/1993 Johnson et al. ............... 349/18
5,347,378 A * 9/1994 Handschy et al. ............. 349/78
6,580,078 B1 * 6/2003 O'Callaghan et al. ........ 250/351
7,196,847 B2 * 3/2007 Ye ............................... 359/501
2005/0100265 A1 * 5/2005 Purchase et al. .............. 385/14

* cited by examiner

*Primary Examiner*—Hung X Dang
*Assistant Examiner*—Tuyen Q Tra
(74) *Attorney, Agent, or Firm*—Glenn H. Lenzen

(57) ABSTRACT

A switchable apochromatic polarization rotator is provided. A first fixed waveplate has a first principal axis fixed in a first orientation. A second fixed waveplate has a second principal axis fixed in a second orientation. First and second switchable waveplates have principal axes oriented such that broad spectral range electromagnetic radiation transmitted through all of the waveplates has a first rotated polarization, wherein, in response to one or more control signals applied to the switchable waveplates, the principal axes of the switchable waveplates rotate such that the electromagnetic radiation transmitted through all of the waveplates has a second rotated polarization. The switchable waveplates utilize ferroelectric liquid crystal material, nematic liquid crystal material, or be mechanically rotated to adjust for orientation of their principal axes. Utilizing waveplates as described may be used to tune for a desired spectral range and/or compensate for temperature dependencies.

48 Claims, 7 Drawing Sheets

BROAD SPECTRAL RANGE POLARIZATION ROTATOR

BACKGROUND

The prior art is familiar with polarization rotators, which are for example useful in image enhancement, polarimetry and optical switching. The polarization rotator receives a beam of optical radiation with a first polarization state and produces a new coaxial beam with a second polarization state. One prior art polarization rotator employs an electrically-switchable half-wave plate that, when switched, converts the incoming beam at a first polarization state into an orthogonal state, for example rotating linearly polarized light by ninety degrees. Another prior art polarization rotator operates similarly but employs twisted nematic liquid crystal in an electrically-switched cell.

But prior art polarization rotators do not simultaneously provide sufficient switching speed over a broad spectral range. For example, prior art polarization rotators employing thick twisted nematic liquid crystals operate over a broad spectral range but have switching speeds limited to seconds. On the other hand, prior art polarization rotators employing a half-wave plate have switching speeds faster than 100 μs but have very limited spectral range. FIG. 1 illustrates the spectral range 10 of a prior art polarization rotator employing one half-wave plate for $\lambda$=550 nm, and the spectral range 12 of a prior art polarization rotator employing three half-wave plates for $\lambda$=550 nm. In FIG. 1, x-axis 14 represents wavelength and y-axis 16 represents percentage of 90 degree rotation of the polarization state.

SUMMARY

In one embodiment, a switchable apochromatic polarization rotator is provided. A first fixed waveplate has a first principal axis fixed in a first orientation. A second fixed waveplate has a second principal axis fixed in a second orientation. First and second switchable waveplates have principal axes oriented such that electromagnetic radiation transmitted through all of the waveplates has a first rotated polarization, wherein, in response to one or more control signals applied to the switchable waveplates, the principal axes of the switchable waveplates rotate such that the electromagnetic radiation transmitted through all of the waveplates has a second rotated polarization.

In one embodiment, a method rotates polarizations of broad spectral range electromagnetic radiation through optics, including: positioning two switchable waveplates and two fixed waveplates such that the electromagnetic radiation transmitted through all of the waveplates has a first rotated polarization; and applying one or more control signals to the switchable waveplates such that the electromagnetic radiation transmitted through all of the waveplates has a second rotated polarization.

In one embodiment, a polarization rotator has two switchable waveplates and two fixed waveplates configured such that broad spectral range electromagnetic radiation transmitted through all of the waveplates has a first rotated polarization. The two switchable waveplates are responsive to one or more applied control signals such that the electromagnetic radiation transmitted through all of the waveplates has a second rotated polarization.

In one embodiment, a tunable polarization rotator has four switchable waveplates configured such that broad spectral range electromagnetic radiation transmitted through all of the waveplates has a first rotated polarization. The switchable waveplates change retardation in response to one or more applied control signals such that the electromagnetic radiation transmitted through all of the waveplates has a second rotated polarization.

In one embodiment, a method tunes the spectral range of polarization rotation of electromagnetic radiation through optics by changing control signals on four switchable waveplates. The method may include positioning four switchable waveplates, followed by a polarizer, such that a first spectral range of electromagnetic radiation is transmitted through all of the waveplates and the polarizer; and then applying the control signals to the switchable waveplates such that a second spectral range of the electromagnetic radiation is transmitted through all of the waveplates and the polarizer.

DETAILED DESCRIPTION OF THE FIGURES

Figure 2:
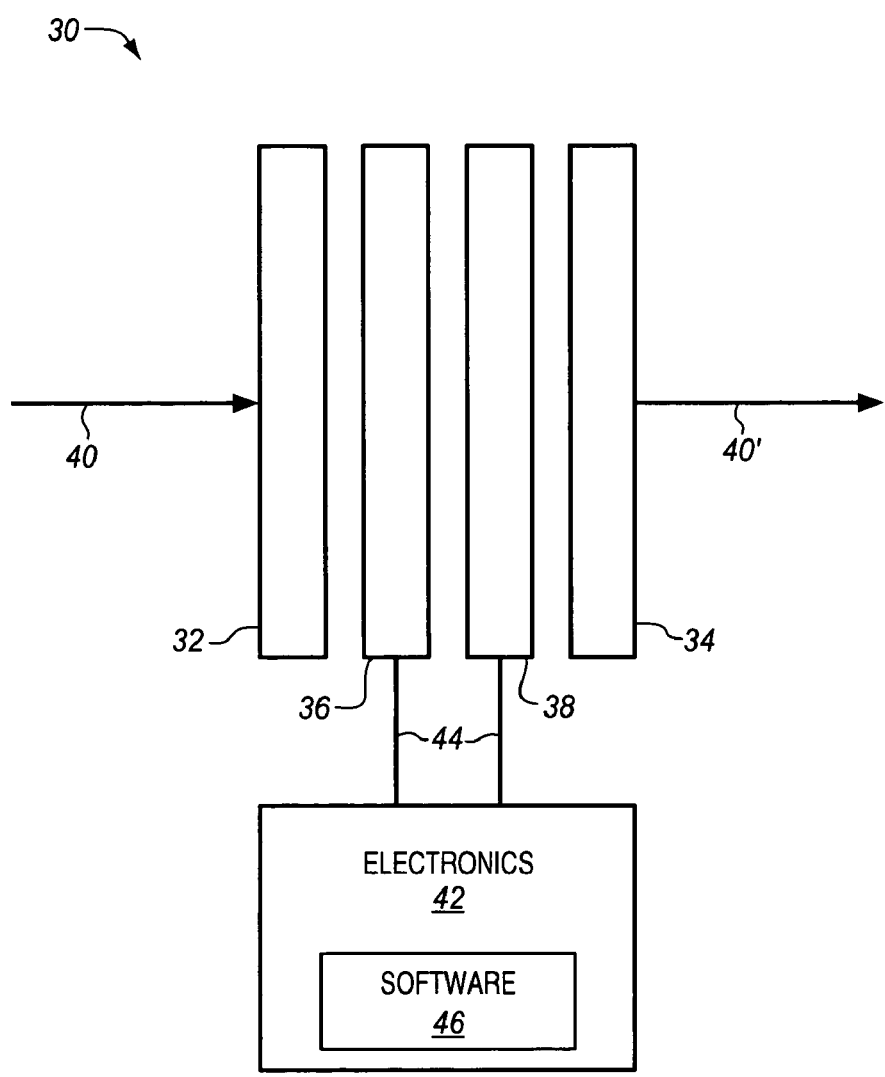
FIG. 2 shows one broad spectral range polarization rotator.

FIG. 2 shows one broad spectral range polarization rotator 30. Rotator 30 has a first fixed waveplate 32, a second fixed waveplate 34, a first switchable waveplate 36 and a second switchable waveplate 38. Broad spectral range electromagnetic radiation 40 incident upon rotator 30 transmits through rotator 30 as output radiation 40'. Radiation 40' has a polarization state that is rotated from the polarization state of incident radiation 40.

The term apochromatic is useful in characterizing polarization rotator 30 since it is capable of rotating polarization of input radiation 40 with an acceptable polarization rotation efficiency across a broad spectral range. Polarization rotation efficiency may be illustratively defined as a fraction $\rho$, such that when polarization rotator 30 is placed between crossed-polarizers, the fraction of input radiation that passes through the polarization rotator (a) at a first state is greater than $\rho$ and (b) at a second state is less than 1−$\rho$. A polarization rotation efficiency $\rho$ equal or greater than 0.95 (ignoring polarization independent losses) is required for most applications. We characterize spectral range by wavelength ratio, i.e., the ratio of longest and shortest wavelength. For the purpose of this disclosure, a broad spectral range may be defined as a spectral range where the wavelength ratio is approximately 2.1 or greater. Increasing the incidence angle has the effect of increasing the effective retardation of all the waveplates, which shifts the center wavelength of the spectral range of the polarization rotation. Therefore broad spectral range at one incidence angle can be considered equivalent to broad incidence angle range at one wavelength. Thus rotator 30 may be advantageous in situations where incidence angle range is required, for example, to accommodate a large field of view or a low f-number optical system.

Each waveplate is characterized by its principal axes and retardation. It is usually made of birefringent materials, including biaxial materials. Each fixed waveplate 32, 34 is for example a half-wave plate ($\lambda$/2 plate) with a retardation of approximately one-hundred and eighty degrees for a specific wavelength λ. This specific wavelength λ is within the broad spectral range transmitted through polarization rotator 30; the actual value of λ is determined by specific application of rotator 30. In the examples and figures that follow, the half-wave plates are for λ=550 nm.

Figure 6:
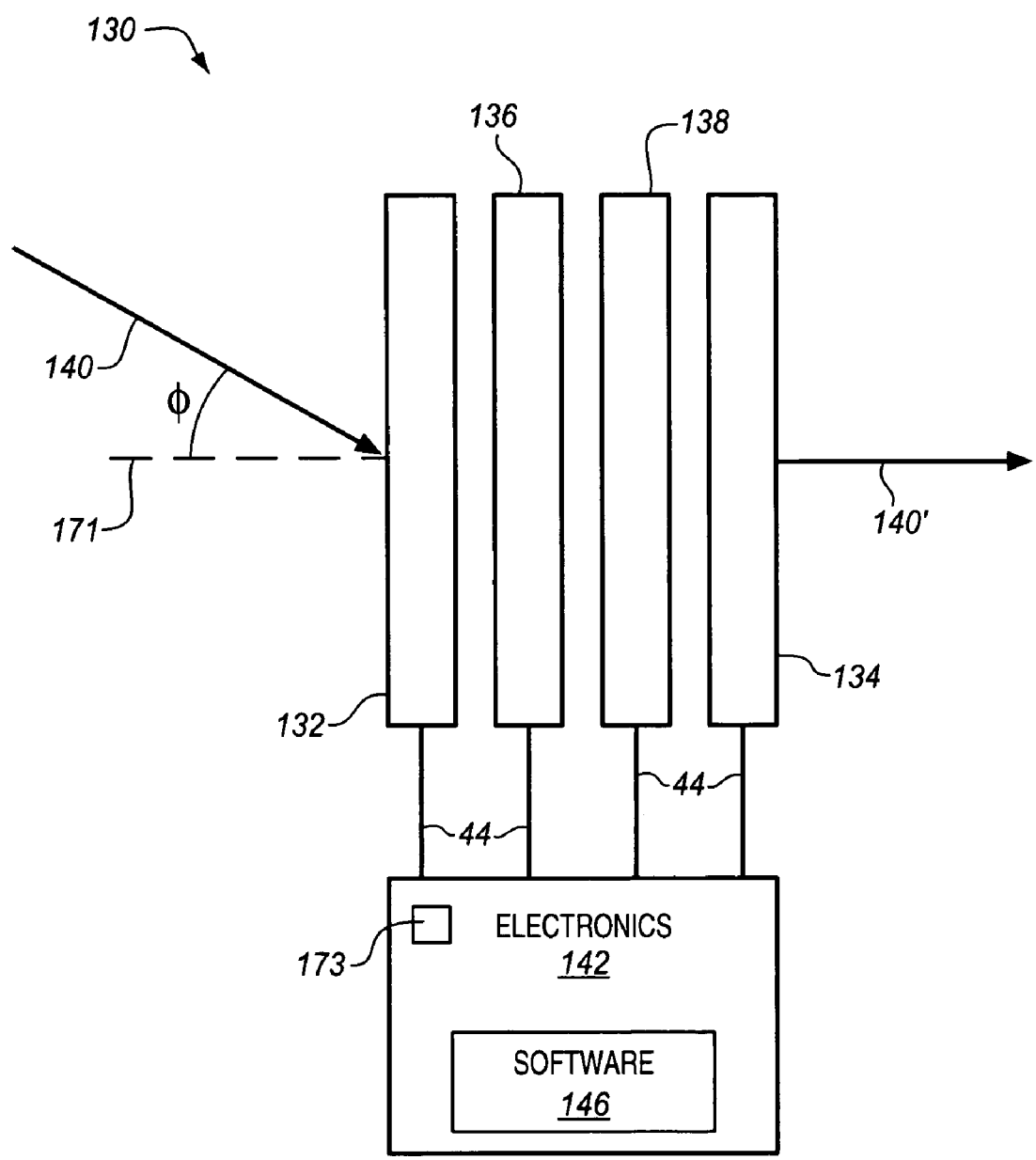
FIG. 6 shows one apochromatic polarization rotator.
Figure 7:
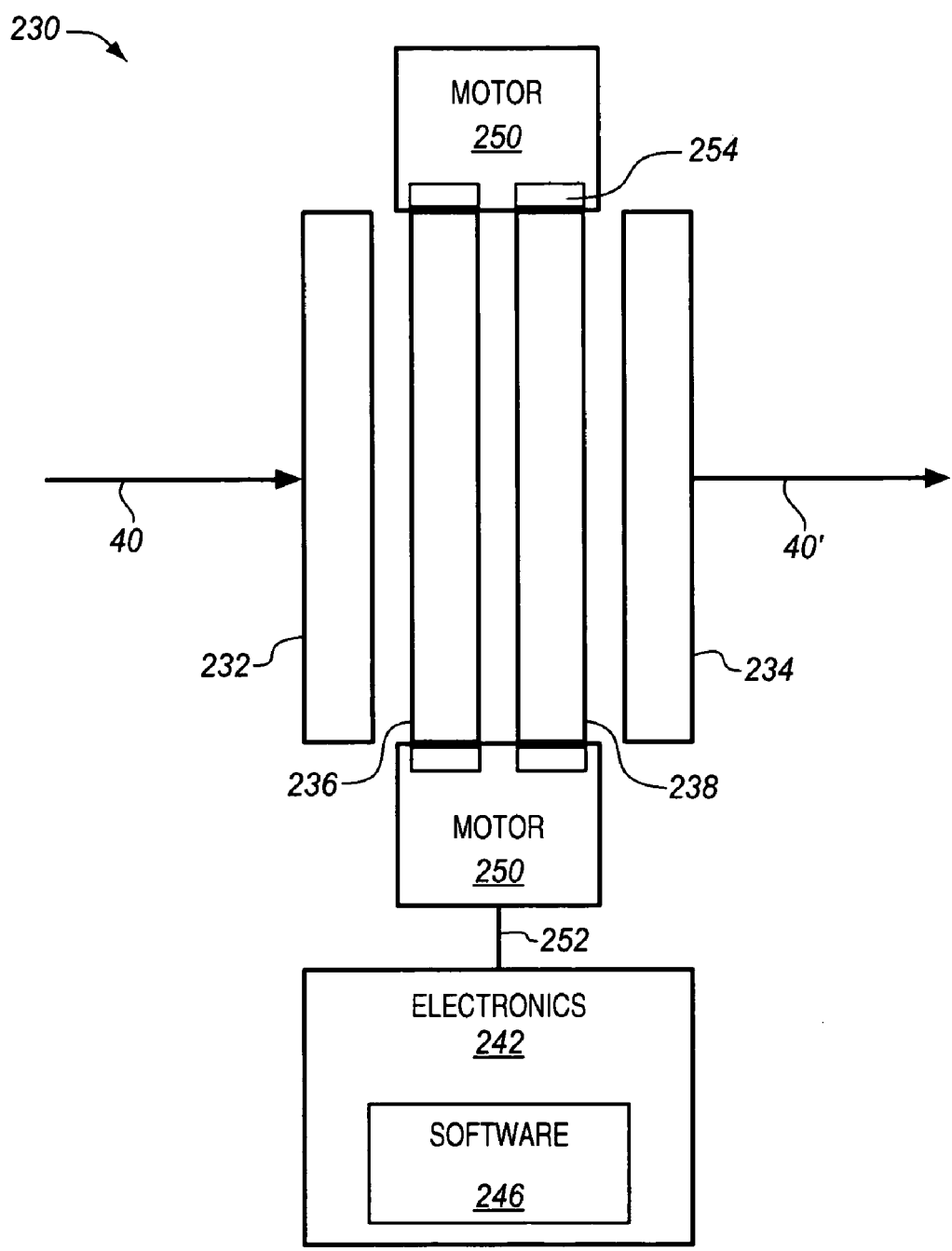
FIG. 7 shows one apochromatic polarization rotator.

A "switchable waveplate" means that its principal axis is changeable. either by applying voltage to the waveplate (e.g., to change its retardation or to reorient the principal axis) as shown in FIG. 2 and FIG. 6, or by physically rotating the waveplate, as in FIG. 7. One exemplary switchable waveplate is thus a half-wave plated made from a film of liquid crystal material, which provides both low loss and thin packaging. Other embodiments of switchable waveplates are described hereinbelow.

More particularly, the principal axes of first and second fixed waveplates 32, 34 is fixed in orientation. The principal axes of first and second switchable waveplates 36, 38 depend upon control signals (e.g., voltage or current) applied to first and second switchable waveplates 36, 38. In an embodiment, switchable waveplates 36, 38 employ ferroelectric liquid crystal material such that the principal axes rotate in response to the applied control signals.

In an embodiment, electronics 42 coupled to first and second switchable waveplates 36, 38 provides the applied control signals via signal lines 44, such as shown. First and second switchable waveplates 36, 38 may be arranged within rotator 30 such that, with a first control signal (control signal 1), broad spectral range electromagnetic radiation 40' as transmitted through all of the waveplates 32, 34, 36, 38 has a first rotated polarization; and with a second control signal (optionally no voltage), broad spectral range electromagnetic radiation 40' as transmitted through all of the waveplates has a second rotated polarization. Thus the principal axes of waveplates 32, 34, 36, 38 may for example be configured according to the following Table 1.

TABLE 1

| Example Orientations of Principal Axes | | | |
|---|---|---|---|
| Fixed ½λ Plate 32 | Switchable ½λ Plate 36 | Switchable ½λ Plate 38 | Fixed ½λ Plate 34 |
| control signal 1 | 7.5° | 29.5° | 60.5° | 82.5° |
| control signal 2 | 7.5° | 97.5° | −7.5° | 82.5° |

The angles listed in Table 1 are approximate and may be changed by about +/−6 degrees while keeping polarization rotation efficiency above 0.95.

The angles listed in Table 1 and discussed hereafter are referenced with respect to the polarization direction of the incoming light, or to the direction perpendicular to it. Furthermore, a positive angle can correspond to either a clockwise or counter clockwise direction. Permutations of such angles may generate devices that function in the same manner. Examples shown herein are for ninety degree rotation of the polarization; though smaller rotation angles, can be achieved by altering the listed angles. For example, to achieve 45 degrees rotation, the angles corresponding to control signal 1 are (3.75°, 14.75°, 30.25°, 41.25°), the angles corresponding to control signal 2 (no rotation) are (3.75°, 93.75°, −47.75°, 41.25°).

More generally, first and second switchable waveplates 36, 38 may be arranged within rotator 30 such that, with a first control signal (control signal 1) on signal lines 44, broad spectral range electromagnetic radiation 40' as transmitted through all of the waveplates 32, 34, 36, 38 has a first rotated polarization; and with a second control signal (control signal 2) on signal lines 44, broad spectral range electromagnetic radiation 40' as transmitted through all of the waveplates has a second rotated polarization. The principal axes of waveplates 32, 34, 36, 38 may thus be configured as in alternate configurations set forth in Table 2, for example, where S represents a switchable waveplate (36, 38, each the same or substantially similar) and where F represents a fixed waveplate (32, 34, each substantially similar).

TABLE 2

| Waveplate Sequences and Principal Axes Orientations | | | | |
|---|---|---|---|---|
| | F | S | S | F |
| control signal 1 | 7.5° | 29.5° | 60.5° | 82.5° |
| control signal 2 | 7.5° | 97.5° | −7.5 | 82.5 |
| | S | F | S | F |
| control signal 1 | 7.5° | 29.5° | 60.5° | 82.5° |
| control signal 2 | −60.5° | 29.5° | −7.5° | 82.5° |
| | S | F | F | S |
| control signal 1 | 7.5° | 29.5° | 60.5° | 82.5° |
| control signal 2 | −60.5° | 29.5° | 60.5° | −29.5° |
| | F | S | F | S |
| control signal 1 | 7.5° | 29.5° | 60.5° | 82.5° |
| control signal 2 | 7.5° | 97.5° | 60.5° | −29.5° |

It should be apparent that the waveplates may be configured such that one of control signals 1 or 2 in effect has no signal (e.g., zero applied voltage).

Figure 3:
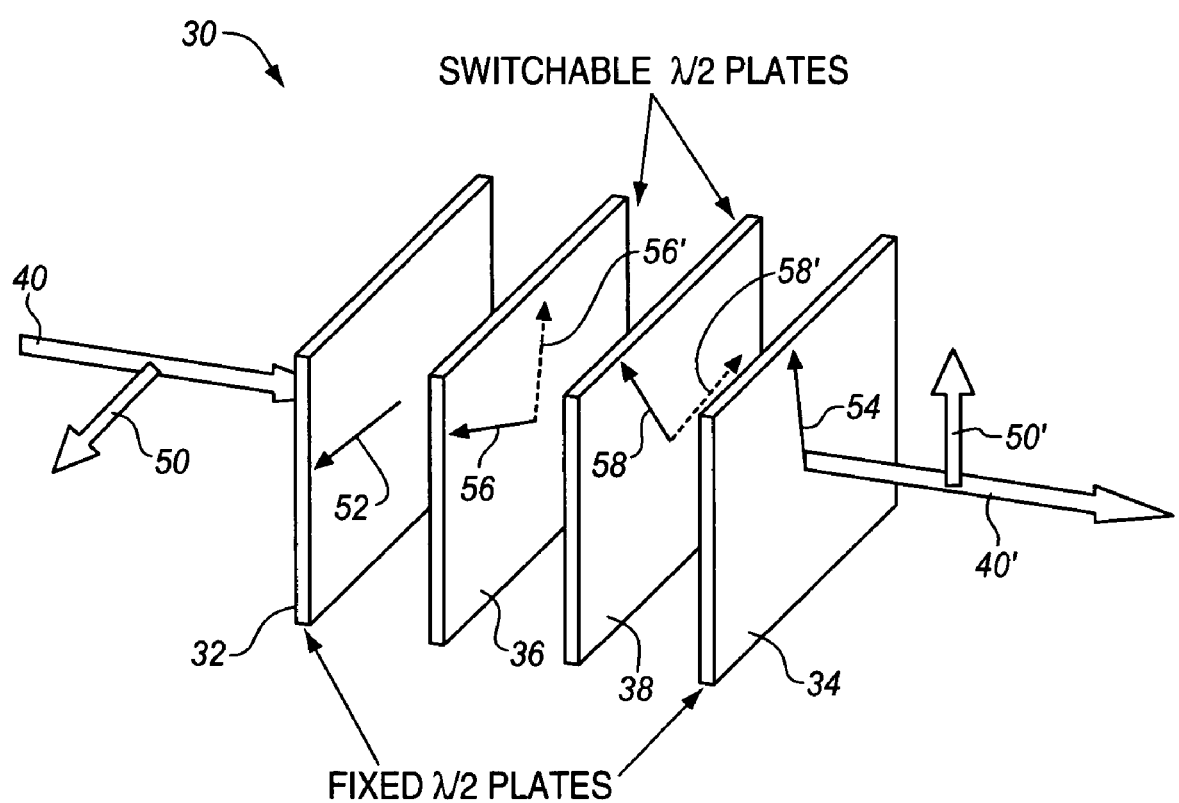
FIG. 3 shows a perspective, operational view of the polarization rotator of FIG. 2.

FIG. 3 shows a perspective, operational view of polarization rotator 30 configured as in Table 1. Incident electromagnetic radiation 40 is shown with a first polarization state 50; output radiation 40' is shown with a second polarization state 50' that is rotated from polarization state 50. First fixed waveplate 32 has its principal axis oriented to axis 52; first switchable waveplate 36 has its principal axis oriented to axis 56 (with control signal 1); second switchable waveplate 38 has its principal axis oriented to axis 58 (with control signal 1); and second fixed waveplate 34 has its principal axis oriented to axis 54, as shown. When control signal 2 is applied to switchable waveplates 36, 38, axes 56, 58 rotate (shown illustratively as axes 56' and 58') and the polarization state of output radiation 40' is the same as polarization state 50 of incident radiation 40. That is, when control signal 2 is applied, in this example, polarization state of radiation 40 is unrotated.

For example, polarization rotator 30 may be configured as in FIG. 3 except that polarization rotation occurs without applied voltage (e.g., as control signal 1). When voltage is applied (e.g., as control signal 2) to switchable waveplates 36, 38, the polarization state of output radiation 40' is the same as incident radiation 40 (i.e., polarization state 50).

Figure 4:
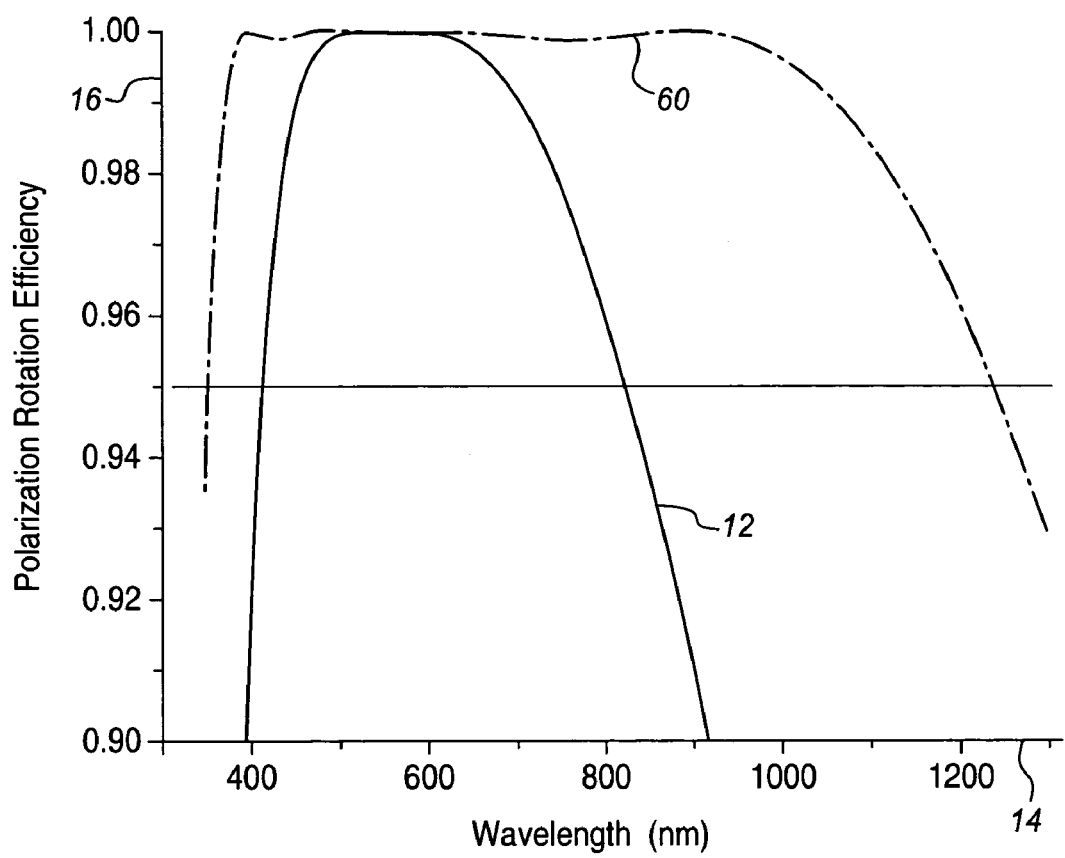
FIG. 4 illustrates spectral range of the polarization rotator of FIG. 2.

FIG. 4 graphically depicts spectral range 60 of polarization rotator 30. Spectral range 12 of a prior art polarization rotator employing three waveplates is also shown, to illustrate the increased spectral bandpass provided by rotator 30. As in FIG. 1, x-axis 14 represents wavelength and y-axis 16 represents percentage of 90 degree rotation of the polarization state. The illustrated embodiment operates over a wavelength ratio of 3.5, i.e., the ratio of longest wavelength to shortest wavelength over which ρ>0.95. The prior art operates over a wavelength ratio of only 2.1.

In FIG. 3, switchable waveplates 36, 38 are shown positioned between first and second fixed waveplates 32, 34; however this is not a requirement. For example, assuming the switchable waveplates are identical and the fixed waveplates are identical, any of the following four arrangements may be used: SFSF, FSFS FSSF or SFFS, where again S represents a switchable waveplate (36, 38) and where F represents a fixed waveplate (32, 34).

Figure 5:
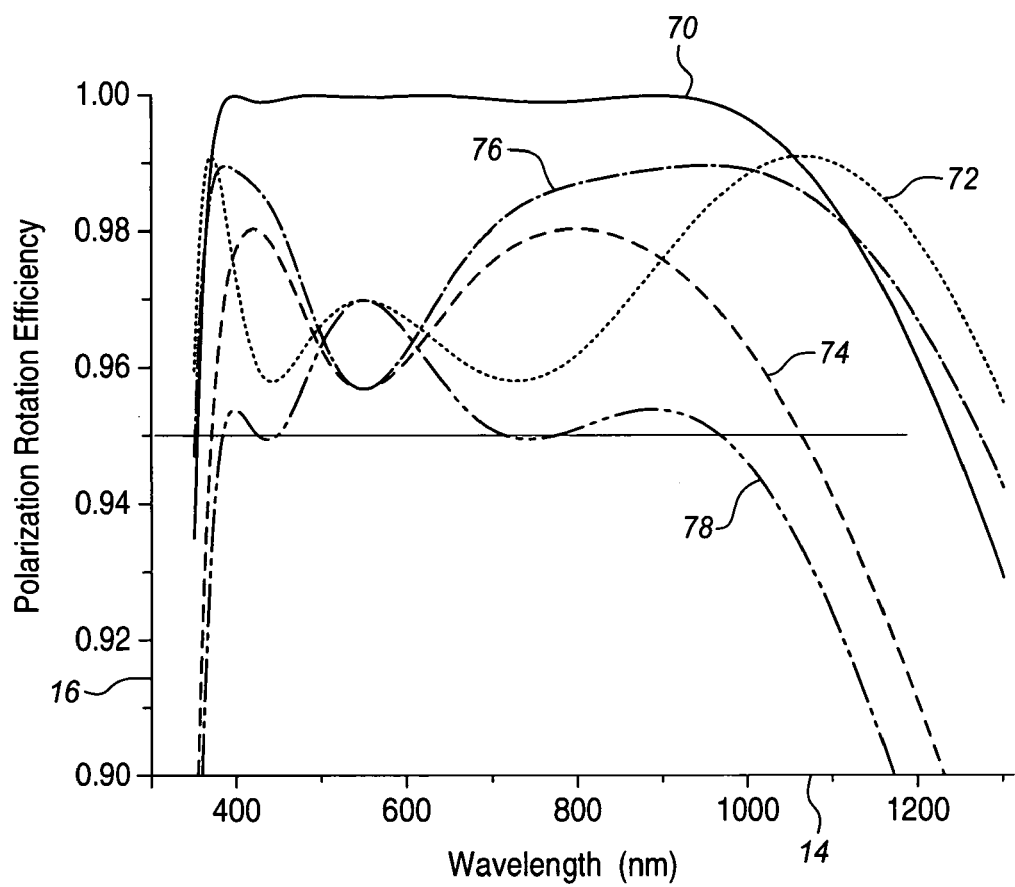
FIG. 5 illustrates polarization rotation efficiency with alignment and/or manufacturing tolerance errors.

In addition, the angular specifications set forth in Table 1 need not be exactly implemented within rotator 30 to function appropriately. The angle between adjacent elements of rotator 30 may have a tolerance of +/−one degree, for example, and the resulting rotator 30 will still operate with polarization rotation efficiency larger than 0.99, thus providing for certain manufacturing tolerance and/or misalignment during assembly. FIG. 5 illustrates polarization rotation efficiency with variations in principal axes caused by such misalignment or tolerance: curve 70 represents Table 2 specification of (7.5°, 29.5°, 60.5°, 82.5°); curve 72 represents an incremental increase by 6° (7.5°, 35.5°, 60.5° 82.5°); curve 74 represents an incremental decrease by 5° (7.5°, 24.5°, 60.5°, 82.5°); curve 76 represents an incremental decrease by 4° (7.5°, 28.5°, 60.5°78.5°); and curve 78 represents an incremental increase by 7° (7.5°, 28.5°, 60.5°, 89.5°). The polarization rotation efficiency from 400 nm to 1200 nm is still above 0.95 even with the variances.

Referring again to FIG. 2, electronics 42 may operate automatically according to programming instructions of software 46, for example. Accordingly, a computer under control of a microprocessor may function as electronics 42 and software 46; a user may thus operate the computer to selectively rotate polarization rotation of rotator 30, for example. Moreover, since signals on signal lines 44 may be identical, and since each switchable waveplate 36, 38 may be switched simultaneously, polarization rotator 30 may be controlled by a single, low voltage channel. This switching can thus occur quickly, for example at 100 μs when the switchable waveplate utilizes ferroelectric liquid crystal. Rotator 30 may thus provide both broad spectral range and fast switching capability.

Polarization rotator 30 may therefore benefit certain applications, particularly with its improved speed and spectral range as compared to the prior art. For example, when followed by a polarizer, rotator 30 can act as a switchable polarization filter. In another example, rotator 30 may be beneficially used in polarization imaging applications, in which two consecutive images are taken of the same subject, each of different polarization states. These two images are further processed to determine specific polarization signatures of the subject. Accordingly the fast switching speed achieved by polarization rotator 30 is especially useful in capturing such polarization signatures, since images may be taken one after another without misregistration between the images due to motion. In still another example, with a non-absorbing polarizer coupled with the rotator, the rotator may function as a broad band beam steering device.

Figure 1:
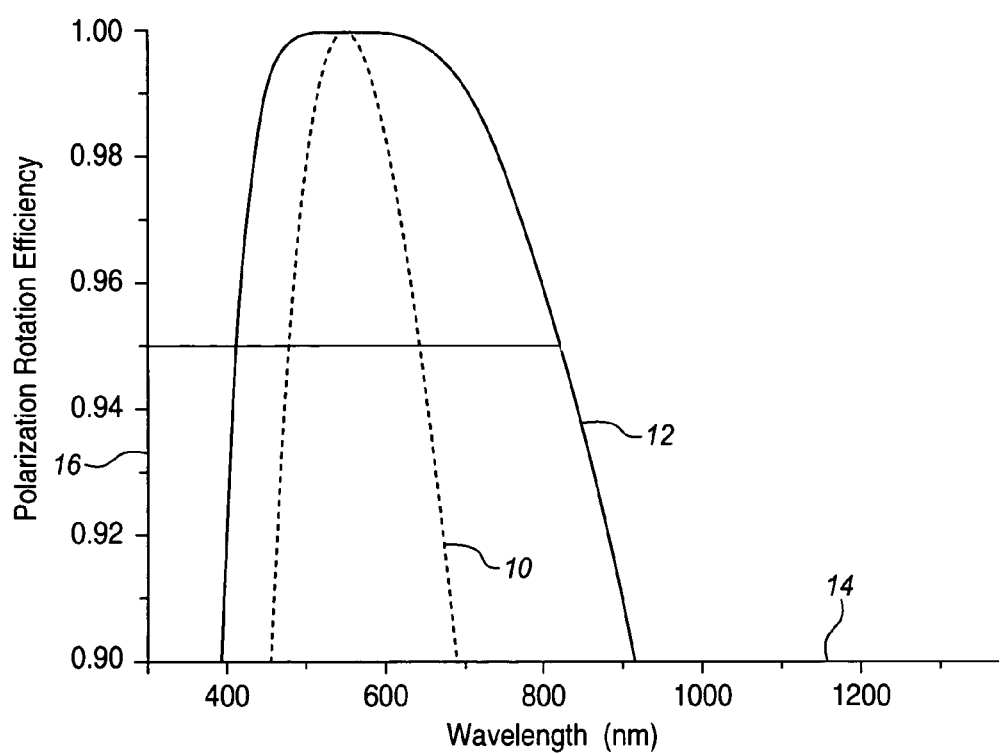
FIG. 1 graphically depicts spectral range of prior art polarization rotators employing half-wave plates.

FIG. 6 shows one apochromatic polarization rotator 130; rotator 130 may again be configured to operate across a broad spectral range such as described in FIG. 1. Rotator 130 has a first switchable waveplate 132, a second switchable waveplate 134, a third switchable waveplate 136 and a fourth switchable waveplate 138. Broad spectral range electromagnetic radiation 140 incident upon rotator 30 transmits through rotator 130 as output radiation 140'. Radiation 140' has a polarization state that is rotated from the polarization state of incident radiation 140.

Rotator 130 may thus operate similarly to rotator 30, FIG. 2, except that it is operated by changing retardation of the switchable waveplates. Rotator 130 may for example employ four nematic switchable waveplates, with their principal axes oriented along the angles of 7.5°, 29.5°, 60.5° and 82.5°. Electronics 142 coupled to first, second, third and fourth switchable waveplates 132, 134, 136, 138 provides (e.g., under control of software 146) applied control signals via signal lines 144, such as shown. Under one control signal (e.g., voltage V1 on each signal line 144), the switchable waveplates are arranged for example such that transmission of electromagnetic energy 140 through rotator 130 is rotated by 90 degrees. On another applied control signal (e.g., voltage V2 on each signal line 144), all waveplates 132, 134, 136, 138 are switched to a state where retardation is zero; in this state, electromagnetic radiation 140 transmits straight through rotator 130 without rotation. Switching of rotator 130 can take 15 ms with a conventional nematic material, or less than 1 ms with a dual frequency nematic material. Other electro-optic techniques for varying the retardation of the switchable waveplates, e.g., Pockels cell, may be employed without departing from the scope hereof.

In an embodiment, voltage V1 is also changed to correspondingly alter the retardation for waveplates 132, 134, 136, 138, so that rotator 130 is operable across another wavelength range. In this embodiment, therefore, rotator 130 is "tunable" to a desired wavelength range.

Polarization rotators such as described herein may be beneficially used in spectroscopic polarimetry, to obtain spectral for two separate polarization states; broad band beam steering, to steer an optical beam in one direction due to the first polarization state and then in another direction due to the second polarization state; and fiber optical switching, for example to switch quickly between different fiber based communication channels.

In the case of rotator 130, it is further appreciated that absorption losses of liquid crystal material and the associated transparent conductor (used to activate the liquid crystal material) is particularly low, e.g., less than about one percent. Moreover, a stack of the liquid crystal waveplates may be thin, in the millimeter range (e.g., less than 10 millimeters). Accordingly, rotator 130 may be beneficially used in applications requiring high transmittance and within devices having small dimensions.

In FIG. 6, incident electromagnetic energy 140 is shown at an angle of incidence $\phi$ relative to optical axis 171 of rotator 130. Typically, $\phi$ is zero; however it may be beneficially another angle depending upon application, such as in imaging. An angle change of $\phi$ is equivalent to a change in wavelength $\lambda$; thus, over a spectral range, rotator 130 maintains its polarization efficiency at an incident angle up to, approximately, +/−60 degrees (angle $\phi$). Similarly temperature change will introduce shift of the working wavelength range. Due to the broad band nature of the device, rotator 130 may thus provide tolerance of temperature dependence of electrooptic effects.

Voltages applied to rotator 130 may also be chosen to compensate for environmental changes such as temperature. A temperature sensor 173 may be included to measure actual temperature. Retardation of liquid crystal material of waveplates 132, 134, 136, 138 varies with temperature, so by adjusting V1, temperature changes may be mitigated to maintain performance of rotator 130. Electronics 142 may automatically adjust V1 based upon temperature of sensor 173, for example, so that rotator automatically compensates for temperature variation.

FIG. 7 shows one apochromatic polarization rotator 230; rotator 230 may again be configured to operate across a broad spectral range such as described in FIG. 2. Rotator 230 has a first fixed waveplate 232, a second fixed waveplate 234, first switchable waveplate 236 and a second switchable waveplate 238. Each waveplate 232, 234, 236, 238 is for example a half-wave plate with a retardation of approximately 180 degrees for a specific wavelength λ; however waveplates 236, 238 are configured to rotate (thus being "switchable" due to rotation) when driven by a motor 250. In particular, by applying control signals 252 to motor 250 (e.g., via electronics 242 under control of software 246), motor 250 rotates waveplates 236, 238, to rotate orientation of their respective principal axes. Motor 250 may in particular rotate each waveplate 236, 238 separately—such as through operation of a clutch engagement mechanism 254 (or other similarly functioning device, even a separate motor)—so that rotation of waveplates 236, 238 may occur in accordance with Table 2, for example (i.e., where the principal axes are not co-aligned). Control signals 252 may thus correspond to applied voltages that induce mechanical toque or force onto waveplates 236, 238 via motor 250.

Changes may be made to this application without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A switchable apochromatic polarization rotator, comprising:
   a first fixed waveplate having a first principal axis fixed in a first orientation;
   a second fixed waveplate having a second principal axis fixed in a second orientation, the first and second fixed waveplates being substantially similar; and
   first and second substantially similar switchable waveplates having principal axes oriented such that electromagnetic radiation transmitted through all of the waveplates has a first rotated polarization, wherein, in response to one or more applied control signals, the principal axes of the switchable waveplates rotate such that the electromagnetic radiation transmitted though all of the waveplates has a second rotated polarization;
   wherein the first and second orientation being approximately in a range of 3.75 to 82.5 degrees, and further wherein the principal axes of the first and second switchable waveplates being approximately in a range of 7.5 to 82.5 degrees, and being switchable to approximately a range of −60.5 to 97.5 degrees, based upon the control signals applied to the switchable waveplates;
   and wherein the sequencing of the waveplates is arranged as FSSF, where S represents the first and second switchable waveplates and F represents the first and second fixed waveplates, and the principal axes of these waveplates are approximately configured with control signal 1 as F(7.5°), S(29.5°), S(60.5°), F(82.5°) and control signal 2 as F(7.5°), S(97.5°), S(−7.5°), F(82.5°).

2. The rotator of claim 1, the first and second switchable waveplates comprising ferroelectric liquid crystal material responsive to the control signals.

3. The rotator of claim 2, wherein the range of the first and second orientations and the range of the principal axes may vary by six degrees.

4. The rotator of claim 1, the rotator having polarization rotator efficiency greater than 0.95 within a spectral band about wavelength λ.

5. The rotator of claim 1, wherein the waveplates have a combined thickness along an optical axis of less than about ten millimeters.

6. The rotator of claim 1, wherein incident electromagnetic energy to the rotator is up to about 60 degrees from normal incidence.

7. The rotator of claim 6, wherein the incident electromagnetic energy is uncollimated or divergent.

8. The rotator of claim 1, further comprising a polarizer such that the rotator functions as a switchable polarization filter.

9. The rotator of claim 1, further comprising a non-absorbing polarizer such that the rotator functions as a broad band beam steering device.

10. The rotator of claim 1, the switchable waveplates comprising liquid crystal waveplates and being configured to rotate polarization other than 90 degrees.

11. The rotator of claim 10, wherein the liquid crystal waveplates are configured to rotate polarization 45 degrees, and further wherein if the waveplates are arranged FSSF, then the principal axes of these waveplates are approximately configured with control signal 1 as F(3.75°), S(14.75°), S(30.25°), F(41.25°) and control signal 2 as F(3.75°), S(93.75°), S(−47.75°), F(41.25°).

12. A method for rotating polarization of broad spectral range electromagnetic radiation through optics, comprising:
   positioning two switchable waveplates (S) and two fixed waveplates (F) such that broad spectral range electromagnetic radiation transmitted through all of the waveplates has a first rotated polarization; and
   applying one or more control signals to the switchable waveplates S such that the electromagnetic radiation transmitted through all of the waveplates has a second rotated polarization;
   wherein a first orientation of an axis of the first fixed wave plate and a second orientation of an axis of the second fixed waveplate are approximately in a range of 7.5 to 82.5 degrees, and further wherein principal axes of the first and second switchable waveplates are approximately in a range of 7.5 to 82.5 degrees, and are switchable to approximately a range of −60.5 to 97.5 degrees, based upon the control signals applied to the switchable waveplates;
   sequencing the waveplates FSSF; and
   configuring the principal axes of these waveplates with control signal 1 as approximately F(7.5°), S(29.5°), S(60.5°), F(82.5°) and control signal 2 as approximately F(7.5°), S(97.5°), S(−7.5°), F(82.5°).

13. A switchable apochromatic polarization rotator, comprising:
   a first fixed waveplate having a first principal axis fixed in a first orientation;
   a second fixed waveplate having a second principal axis fixed in a second orientation; and
   first and second switchable waveplates having principal axes oriented such that electromagnetic radiation transmitted through all of the waveplates has a first rotated polarization, wherein, in response to one or more applied control signals, the principal axes of the switchable waveplates rotate such that the electromagnetic radiation transmitted though all of the waveplates has a second rotated polarization,
   and further wherein the first orientation being approximately 7.5 degrees, the second orientation being approximately 82.5 degrees: the principal axes of the first and second switchable waveplates being approximately 29.5 degrees and approximately 60.5 degrees, respectively, and being switchable to approximately 97.5 degrees and approximately −7.5 degrees, respectively, based upon the control signals applied to the switchable waveplates.

14. The rotator of claim 13, wherein an angle of incidence for electromagnetic radiation, relative to an optical axis of the rotator, is in the range of 0-60 degrees.

15. The rotator of claim 13, wherein the switchable waveplates are a liquid crystal material, and further wherein the rotator comprises a temperature sensor.

16. A switchable apochromatic polarization rotator, comprising:
   a first fixed waveplate having a first principal axis fixed in a first orientation;
   a second fixed waveplate having a second principal axis fixed in a second orientation, the first and second fixed waveplates being substantially similar; and
   first and second substantially similar switchable waveplates having principal axes oriented such that electromagnetic radiation transmitted through all of the waveplates has a first rotated polarization, wherein, in response to one or more applied control signals, the principal axes of the switchable waveplates rotate such that the electromagnetic radiation transmitted though all of the waveplates has a second rotated polarization;
   wherein the first and second orientation being approximately in a range of 3.75 to 82.5 degrees, and further wherein the principal axes of the first and second switchable waveplates being approximately in a range of 7.5 to 82.5 degrees, and being switchable to approximately a range of −60.5 to 97.5 degrees, based upon the control signals applied to the switchable waveplates; and
   wherein the sequencing of the waveplates is arranged as SFSF, where S represents the first and second switchable waveplates and F represents the first and second fixed waveplates, and the principal axes of these waveplates are approximately configured with control signal 1 as S(7.5°), F(29.5°), S(60.5°), F(82.5°) and control signal 2 as S(−60.5°), F(29.5°), S(−7.5°), F(82.5°).

17. The rotator of claim 16, the first and second switchable waveplates comprising ferroelectric liquid crystal material responsive to the control signals.

18. The rotator of claim 17, wherein the range of the first and second orientations and the range of the principal axes may vary by six degrees.

19. The rotator of claim 16, the rotator having polarization rotator efficiency greater than 0.95 within a spectral band about wavelength $\lambda$.

20. The rotator of claim 16, wherein the waveplates have a combined thickness along an optical axis of less than about ten millimeters.

21. The rotator of claim 16, wherein incident electromagnetic energy to the rotator is up to about 60 degrees from normal incidence.

22. The rotator of claim 21, wherein the incident electromagnetic energy is uncollimated or divergent.

23. The rotator of claim 16, further comprising a polarizer such that the rotator functions as a switchable polarization filter.

24. The rotator of claim 16, further comprising a non-absorbing polarizer such that the rotator functions as a broad band beam steering device.

25. The rotator of claim 16, the switchable waveplates comprising liquid crystal waveplates and being configured to rotate polarization other than 90 degrees.

26. A switchable apochromatic polarization rotator, comprising:
   a first fixed waveplate having a first principal axis fixed in a first orientation;
   a second fixed waveplate having a second principal axis fixed in a second orientation, the first and second fixed waveplates being substantially similar; and
   first and second substantially similar switchable waveplates having principal axes oriented such that electromagnetic radiation transmitted through all of the waveplates has a first rotated polarization, wherein, in response to one or more applied control signals, the principal axes of the switchable waveplates rotate such that the electromagnetic radiation transmitted though all of the waveplates has a second rotated polarization;
   wherein the first and second orientation being approximately in a range of 3.75 to 82.5 degrees, and further wherein the principal axes of the first and second switchable waveplates being approximately in a range of 7.5 to 82.5 degrees, and being switchable to approximately a range of −60.5 to 97.5 degrees, based upon the control signals applied to the switchable waveplates; and
   wherein the sequencing of waveplates is arranged SFFS where S represents the first and second switchable waveplates and F represents the first and second fixed waveplates; and the principal axes of these waveplates are approximately configured with control signal 1 as S(7.5°), F(29.5°), F(60.5°), S(82.5°) and control signal 2 as S(−60.5°), F(29.5°), F(60.5°), S(−29.5°).

27. The rotator of claim 26, the first and second switchable waveplates comprising ferroelectric liquid crystal material responsive to the control signals.

28. The rotator of claim 27, wherein the range of the first and second orientations and the range of the principal axes may vary by six degrees.

29. The rotator of claim 26, the rotator having polarization rotator efficiency greater than 0.95 within a spectral band about wavelength $\lambda$.

30. The rotator of claim 26, wherein the waveplates have a combined thickness along an optical axis of less than about ten millimeters.

31. The rotator of claim 26, wherein incident electromagnetic energy to the rotator is up to about 60 degrees from normal incidence.

32. The rotator of claim 31, wherein the incident electromagnetic energy is uncollimated or divergent.

33. The rotator of claim 26, further comprising a polarizer such that the rotator functions as a switchable polarization filter.

34. The rotator of claim 26, further comprising a non-absorbing polarizer such that the rotator functions as a broad band beam steering device.

35. The rotator of claim 26, the switchable waveplates comprising liquid crystal waveplates and being configured to rotate polarization other than 90 degrees.

36. A switchable apochromatic polarization rotator, comprising:
   a first fixed waveplate having a first principal axis fixed in a first orientation;
   a second fixed waveplate having a second principal axis fixed in a second orientation, the first and second fixed waveplates being substantially similar; and
   first and second substantially similar switchable waveplates having principal axes oriented such that electromagnetic radiation transmitted through all of the waveplates has a first rotated polarization, wherein, in response to one or more applied control signals, the principal axes of the switchable waveplates rotate such that the electromagnetic radiation transmitted though all of the waveplates has a second rotated polarization;

wherein the first and second orientation being approximately in a range of 3.75 to 82.5 degrees, and further wherein the principal axes of the first and second switchable waveplates being approximately in a range of 7.5 to 82.5 degrees, and being switchable to approximately a range of −60.5 to 97.5 degrees, based upon the control signals applied to the switchable waveplates; and wherein the sequencing of the waveplates is arranged FSFS, and S represents the first and second switchable waveplates and F represents the first and second fixed waveplates, and the principal axes of these waveplates are approximately configured with control signal 1 as F(7.5°), S(29.5°), F(60.5°), S(82.5°) and control signal 2 as F(7.5°), S(97.5°), F(60.5°), S(−29.5°).

37. The rotator of claim 36, the first and second switchable waveplates comprising ferroelectric liquid crystal material responsive to the control signals.

38. The rotator of claim 37, wherein the range of the first and second orientations and the range of the principal axes may vary by six degrees.

39. The rotator of claim 36, the rotator having polarization rotator efficiency greater than 0.95 within a spectral band about wavelength λ.

40. The rotator of claim 36, wherein the waveplates have a combined thickness along an optical axis of less than about ten millimeters.

41. The rotator of claim 36, wherein incident electromagnetic energy to the rotator is up to about 60 degrees from normal incidence.

42. The rotator of claim 41, wherein the incident electromagnetic energy is uncollimated or divergent.

43. The rotator of claim 36, further comprising a polarizer such that the rotator functions as a switchable polarization filter.

44. The rotator of claim 36, further comprising a non-absorbing polarizer such that the rotator functions as a broad band beam steering device.

45. The rotator of claim 36, the switchable waveplates comprising liquid crystal waveplates and being configured to rotate polarization other than 90 degrees.

46. A method for rotating polarization of broad spectral range electromagnetic radiation through optics, comprising:

positioning two switchable waveplates (S) and two fixed waveplates (F) such that broad spectral range electromagnetic radiation transmitted through all of the waveplates has a first rotated polarization; and applying one or more control signals to the switchable waveplates S such that the electromagnetic radiation transmitted through all of the waveplates has a second rotated polarization;

wherein a first orientation of an axis of the first fixed wave plate and a second orientation of an axis of the second fixed waveplate are approximately in a range of 7.5 to 82.5 degrees, and further wherein principal axes of the first and second switchable waveplates are approximately in a range of 7.5 to 82.5 degrees, and are switchable to approximately a range of −60.5 to 97.5 degrees, based upon the control signals applied to the switchable waveplates;

sequencing the waveplates SFSF; and configuring the principal axes of these waveplates with control signal 1 as approximately S(75°), F(29.5°), S(60.5°), F(82.5°) and control signal 2 as approximately S(−60.5°), F(29.5°), s(−7.5), F(82.5°).

47. A method for rotating polarization of broad spectral range electromagnetic radiation through optics, comprising:

positioning two switchable waveplates (S) and two fixed waveplates (F) such that broad spectral range electromagnetic radiation transmitted through all of the waveplates has a first rotated polarization; and applying one or more control signals to the switchable waveplates S such that the electromagnetic radiation transmitted through all of the waveplates has a second rotated polarization;

wherein a first orientation of an axis of the first fixed wave plate and a second orientation of an axis of the second fixed waveplate are approximately in a range of 7.5 to 82.5 degrees, and further wherein principal axes of the first and second switchable waveplates are approximately in a range of 7.5 to 82.5 degrees, and are switchable to approximately a range of −60.5 to 97.5 degrees, based upon the control signals applied to the switchable waveplates;

sequencing the waveplates SFFS; and configuring the principal axes of these waveplates with control signal 1 as approximately S(7.5°), F(29.5°), F(60.5°), S(82.5°) and control signal 2 as approximately S(−60.5°), F(29.5°), F(60.5°), S(−29.5°).

48. A method for rotating polarization of broad spectral range electromagnetic radiation through optics, comprising:

positioning two switchable waveplates (S) and two fixed waveplates (F) such that broad spectral range electromagnetic radiation transmitted through all of the waveplates has a first rotated polarization; and applying one or more control signals to the switchable waveplates S such that the electromagnetic radiation transmitted through all of the waveplates has a second rotated polarization;

wherein a first orientation of an axis of the first fixed wave plate and a second orientation of an axis of the second fixed waveplate are approximately in a range of 7.5 to 82.5 degrees, and further wherein principal axes of the first and second switchable waveplates are approximately in a range of 7.5 to 82.5 degrees, and are switchable to approximately a range of −60.5 to 97.5 degrees, based upon the control signals applied to the switchable waveplates;

sequencing the waveplates FSFS; and configuring the principal axes of these waveplates with control signal 1 as approximately F(7.5°), S(29.5°), F(60.5°), S(82.5°) and control signal 2 as approximately F(7.5°), S(97.5°), F(60.5°), S(−29.5°).

* * * * *